Patented Oct. 11, 1927.

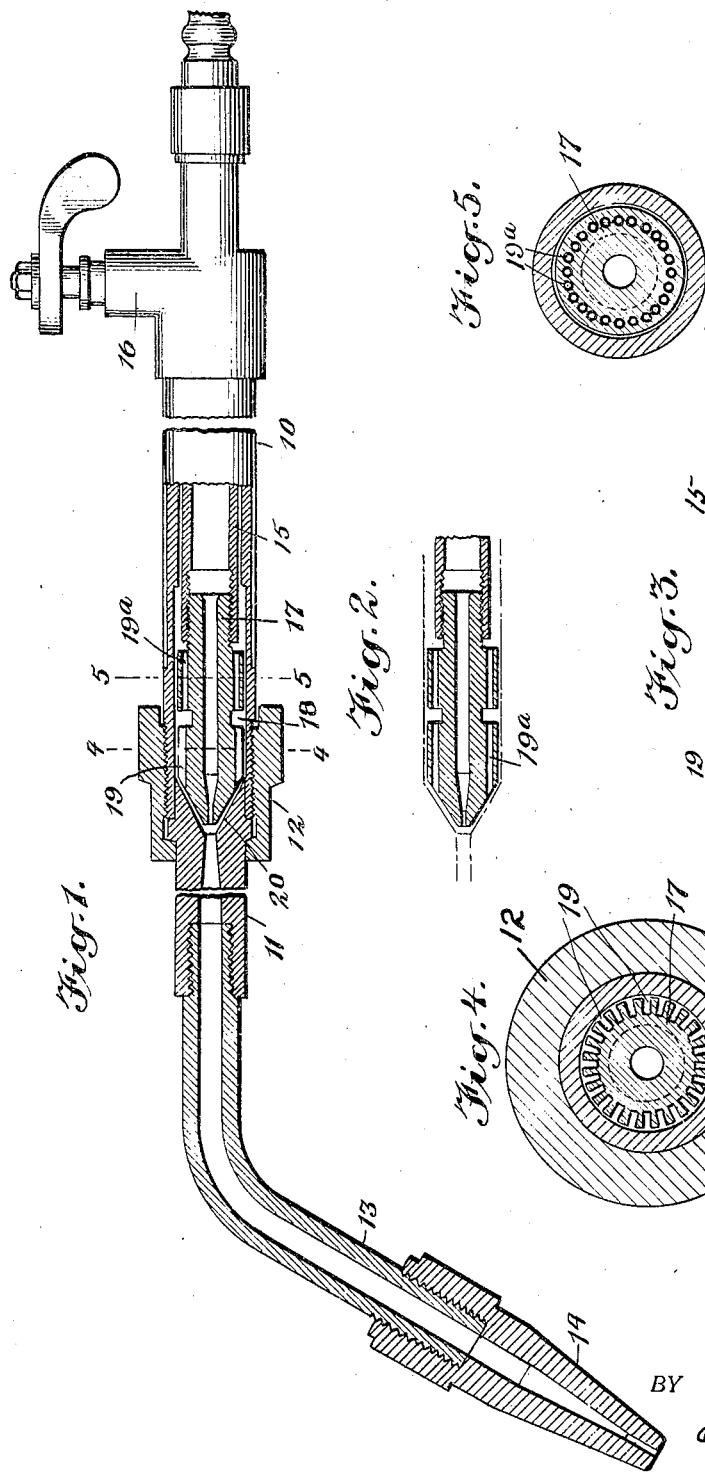

1,645,337

UNITED STATES PATENT OFFICE.

ADOLF MESSER, OF FRANKFORT-ON-THE-MAIN, GERMANY.

WELDING TORCH.

Application filed February 20, 1923, Serial No. 620,195, and in Germany April 29, 1921.

This invention relates to oxyacetylene or other analogous welding or cutting torches or burners, and more particularly to that type in which the oxygen is delivered through a centrally disposed nozzle into the mixing chamber and thereby draws or sucks in the combustible gas from the annular spaces surrounding the oxygen nozzle.

The main object of my invention is to prevent propagation of the flame rearwardly from the mixing chamber through the acetylene or other heating gas passage. In order to accomplish this result I provide as an important feature of my invention an annular chamber encircling the oxygen nozzle intermediate the ends of the latter. The gas in being supplied to the mixing chamber passes across this annular chamber where its velocity and angle of flow is altered. Preferably the space between the oxygen nozzle and the outer wall or tube is constricted upon opposite sides of the annular chamber or is subdivided into a large number of very narrow or small passages which in themselves tend to prevent the rearward propagation of flame from the mixing chamber.

It has been demonstrated by tests of constructions embodying my present invention that by means of such annular chamber and with the multiplicity of small sized supply and delivery passages connected thereto, rearward propagation of flame through the outer or gas passage may be entirely prevented.

In the accompanying drawings:

Fig. 1 is a central longitudinal section of a construction embodying my invention, Figs. 2 and 3 are longitudinal sections of modified forms of oxygen nozzles, and Figs. 4 and 5 are sections through the oxygen nozzle on lines 4—4 and 5—5 respectively of Fig. 1, and on a larger scale.

The torch illustrated includes a tube or handle member 10 connected to a tip or nozzle 11 by means of a coupling or union 12. The tip is preferably of such length that the mixing chamber comes at a considerable distance from the outlet of the burner. As shown the tip includes an elbow piece 13 and a nozzle or outlet member 14. The three parts of the tip may be separable and interchangeable with corresponding parts of different sizes or lengths if desired.

Within the tube or handle 10 is an inner tube 15 serving for the delivery of the oxygen, while the space between such inner tube and the outer tube 10 serves for the delivery of the acetylene or other combustible gas. These gases may be separately controlled by a pair of valves 16 only one of which is shown. The inner or oxygen tube 15 terminates in a nozzle 17 which forms the important feature of my invention. This nozzle is of an exterior diameter substantially equal to the inner diameter of the handle or tube 10 so that the annular space between the two is comparatively small. If desired the two may fit friction tight. The periphery of the oxygen nozzle 17 is provided with one or more annular grooves or chambers 18 and the peripheral wall at opposite sides of this annular groove or chamber is provided with a plurality of very small passages. These may be narrow grooves or slots 19, or they may be very small bored or drilled holes 19$^a$. Grooves or slots may be employed at one side of the annular chamber and drilled holes on the other side, as indicated in Fig. 1, or grooves may be used on both sides as shown in Fig. 3, or drilled holes may be used on both sides as shown in Fig. 2. In practice if grooves be used they may be made about one millimeter in width and two millimeters in depth, and if drilled holes be used they may be about one millimeter in diameter. Thus the acetylene in passing along the outside of the oxygen nozzle passes through one set of small passages, thence into the annular chamber 18, and then through a second set of small passages.

The oxygen nozzle 17 is preferably conical at its end and terminates within a conical seat or recess 20 in the tip 11 at the base end of the mixing passage of the latter. The opposing surfaces of the conical end of the oxygen nozzle and the conical socket are spaced to permit the flow of the acetylene or other heating gas to the mixing passage.

As a further important feature of my invention the angles of these two opposed conical surfaces are such in respect to each other that the surfaces diverge toward the apex of the cones. The rate of divergency is such that the cross sectional area of the small diameter annular passage around the tip portion of the oxygen nozzle is approximately the same as the cross sectional area of the larger diameter annular passage near the base end of the cone. Thus with substantially uniform cross sectional area the velocity of the gas may be maintained substantially constant along the conical surface, and the heating gas as it mixes with the oxygen escaping from the center passage of the oxygen nozzle may enter the mixing passage without material change in velocity of the gas. In other words, by this arrangement there is no portion of the heating gas at or around the outlet portion of the oxygen nozzle which is travelling at a rate materially below the rate of flame propagation when the burner is in normal operation.

Due to the small size of the passages, the high rate of flame propagation, and the small size of the parts, it is difficult to determine with scientific accuracy the exact reason why my improved construction operates so successfully in the prevention of flash back, but I believe that the maintaining of a very small supply of the heating gas at low velocity in the annular chamber 18 and between the two sets of small passages in which the gas travels at high velocity causes such change in the direction of flow of the gas as it enters and leaves the annular chamber that in case flame is propagated rearwardly to this annular chamber the high pressure gas wave strikes the rear surface of the annular chamber and is thus stopped without exerting material pressure tending to carry the flame back up the small passages in the rear of the annular chamber. Furthermore the combustion of the gas in this annular chamber effectively shuts off the oxygen from contact with the heating gas in the rear of the annular chamber. A large series of tests have demonstrated that it is difficult if not impossible to make the torch flash back if constructed substantially as illustrated and above described.

Having thus described my invention, what I claim as new and desire to secure by Letters Patent is:

1. A cutting or welding burner including a heating gas passage and a centrally disposed oxygen nozzle therein terminating in a conical end, the outer surface of the body portion of said oxygen nozzle having an annular groove or chamber intermediate of its ends and the outer surface of said nozzle at opposite sides of said groove being provided with a large number of very small longitudinal passages for the heating gas, the passages at one side of said groove terminating in the conical surface of said end.

2. A heating or welding torch including a member having a passage therethrough provided with a restricted portion, the wall of said passage converging toward said restricted portion at one side, an oxygen delivery nozzle disposed within said passage and terminating adjacent to said restricted portion, the end of said nozzle being conical and approximately parallel to said converging portion, the outer surface of said nozzle having an annular groove intermediate of its ends and a plurality of substantially parallel passages of very small cross-sectional area leading to and from said groove, the passages at one side of said groove terminating at said conical end, the said passages upon the outer surface of said nozzle serving for the heating gas, and the passage in said member beyond said restricted portion serving as a mixing passage for the gases delivered through and along the outside of said member.

Signed at New York in the county of New York, and State of New York this 9th day of February, A. D. 1923.

ADOLF MESSER.